United States Patent [19]
Fauteux et al.

[11] Patent Number: 6,040,078
[45] Date of Patent: Mar. 21, 2000

[54] FREE FORM BATTERY APPARATUS

[75] Inventors: Denis G. Fauteux, Acton; Robert Rounds, III, Boston; Michael Farina, Waltham, all of Mass.

[73] Assignee: Mitsubishi Chemical Corporation, Tokyo, Japan

[21] Appl. No.: 09/179,116

[22] Filed: Oct. 26, 1998

Related U.S. Application Data

[63] Continuation-in-part of application No. 08/812,021, Mar. 6, 1997, Pat. No. 5,853,917.

[51] Int. Cl.$^7$ ...................................................... H01M 6/00
[52] U.S. Cl. .................................. 429/48; 429/57; 429/59; 429/60; 429/61; 429/163; 429/231.9; 429/231.95
[58] Field of Search .................................. 429/48, 57, 59, 429/60, 61, 163, 231.9, 231.95

[56] References Cited

U.S. PATENT DOCUMENTS

| | | | |
|---|---|---|---|
| 1,981,533 | 11/1934 | Williams | 175/315 |
| 4,064,329 | 12/1977 | Naylor | 429/174 |
| 4,186,246 | 1/1980 | Sugalski | 429/60 |
| 4,278,744 | 7/1981 | Athearn | 429/181 |
| 4,374,186 | 2/1983 | McCartney et al. | 429/154 |
| 4,409,304 | 10/1983 | Gerard et al. | 429/158 |
| 4,582,767 | 4/1986 | Morioka et al. | 429/121 |
| 4,889,777 | 12/1989 | Akuto | 429/162 |
| 4,952,465 | 8/1990 | Harris et al. | 429/60 |
| 5,134,046 | 7/1992 | Chow et al. | 429/176 |
| 5,290,640 | 3/1994 | Tsenter et al. | 429/57 |
| 5,314,765 | 5/1994 | Bates | 429/48 |
| 5,326,653 | 7/1994 | Chang | 429/162 |
| 5,374,490 | 12/1994 | Aldecoa | 429/152 |
| 5,401,595 | 3/1995 | Kagawa et al. | 429/152 |
| 5,432,017 | 7/1995 | Hassemer et al. | 429/4 |
| 5,445,906 | 8/1995 | Hobson et al. | 429/162 |
| 5,496,656 | 3/1996 | Inamasu et al. | 429/57 |
| 5,503,948 | 4/1996 | MacKay et al. | 429/152 |
| 5,569,554 | 10/1996 | Tsenter et al. | 429/57 |
| 5,621,618 | 4/1997 | Komiyama | 361/732 |
| 5,704,803 | 1/1998 | Oshima et al. | 439/500 |
| 5,744,261 | 4/1998 | Muffoletto et al. | 429/131 |

*Primary Examiner*—Bruce F. Bell
*Attorney, Agent, or Firm*—Factor and Shaftal

[57] ABSTRACT

A battery apparatus comprising a casing and at least one stacked lithium ion cell which does not require springs, windings, etc. and a member for precluding inadvertent deformation of the casing. Each of at least one stacked lithium ion cell is positioned within the casing. The deformation precluding member is associated with each of the at least one lithium ion cell, and, substantially precludes inadvertent deformation of the casing by the at least one lithium ion cell, during cell cycling and storage. The invention further includes a process for fabricating a battery apparatus.

15 Claims, 2 Drawing Sheets

FREE FORM BATTERY APPARATUS

This is a continuation-in-part of U.S. application Ser. No. 08/812,021 filed on Mar. 6, 1997 now U.S. Pat. No. 5,853,917.

BACKGROUND OF THE INVENTION

1. Field of the Invention

The present invention relates in general to electrochemical cells/batteries, and more particularly, to an electrochemical cell that comprises stackable lithium ion batteries which may have any freeform geometric configuration and which require only a lightweight casing.

2. Background Art

Lithium ion rechargeable batteries for use in all types of applications are well known in the art. Generally, lithium batteries are desirable over other types of rechargeable batteries, including nickel cadmium and nickel metal hydride batteries, due to their lighter weight, energy density and overall efficiency, among other advantages.

Generally, it is desirable to have as light of a battery as possible. Indeed current lithium ion batteries have been produced which have the capacity and the cyclability for use in all types of consumer devices, including, but not limited to portable telephones and lap top computers. However, the current batteries utilize relatively heavy and cumbersome casings.

In particular, battery casings generally comprise a rigid and heavy material. The rigid material prevents buckling of the casing which is caused by internal pressures. The internal pressures are derived from the generation of gas through the decomposition of the electrolyte or of various constituents within the battery. In addition, the casings are typically nickel plated steel which reduces the likelihood of corrosion.

Further, the individual cells that comprise a battery are generally strongly biased against each other through the use of spring plates. The use of strong spring plates increases the weight of the battery. In addition, the spring plates occupy space which could otherwise be used for additional cells which could then increase the capacity of the battery. Lastly, these batteries, due to the necessary housings and spring plates to apply uniform pressure onto the cells, are generally available in common, simple configurations, such as cubes and other box-like shapes and configurations.

SUMMARY OF THE INVENTION

The battery apparatus of the present invention comprises a casing, at least one stacked lithium ion cell and means for substantially precluding inadvertent deformation of the casing. Each of the at least one stacked lithium ion cell is electrically associated with each other and positioned within the casing. The deformation preclusion means is operatively associated with the lithium ion cells. The deformation preclusion means precludes inadvertent deformation of the at least one lithium ion cell during cell cycling and storage.

In a preferred embodiment, the deformation preclusion means comprises means for substantially precluding gas generation within the cell. The gas generation preclusion means substantially precludes gas generation within the cell during decomposition of chemical constituents within the cells, during cell cycling and storage.

In another preferred embodiment, the at least one stacked lithium ion cell comprises at least two stacked lithium ion cells which are formed in a monolithic construction. Inasmuch as the contemplated lithium ion cells are substantially precluded from the generation of any gases, the cells may be of a monolithic construction, or may otherwise be maintained in a stacked orientation, without requiring the aid of windings, springs, clamps or other rigid retaining structures.

Preferably, each of the at least one lithium ion cell comprises a freeform geometric configuration. In such an embodiment, the freeform geometric configuration may comprise a non-uniform geometric cross-section and/or a non-planar configuration. Among other non-planar configurations, the configuration may include an "s-curve," having at least two bend regions, or the configuration may be arcuate.

In any such embodiment, the casing may include a configuration which follows the contours of the freeform geometric configuration of the at least one stacked lithium ion cell, or a configuration which comprises a different freeform geometric configuration. Preferably, the casing may comprise a polymer.

The invention further includes a process for fabricating a battery apparatus. The process includes the step of forming a casing for housing the at least one stackable lithium ion cells. Next, the process includes the step of fabricating the at least one lithium ion cell. This step comprises the step of associating a chemical compound within the cell. The chemical compound substantially precludes inadvertent deformation of the casing by the cells during cell cycling and storage, once the cells are positioned in the casing. Lastly, the process includes the step of positioning the at least one stackable lithium ion cell within the casing.

In a preferred embodiment, the process may further include the step of forming at least two stackable lithium ion cells into a monolithic construction.

In another preferred embodiment, the step of forming the casing comprises the step of forming the casing to include an inner periphery which conforms to the outer periphery of the at least one stackable lithium ion cell.

In yet another preferred embodiment, wherein each cell includes a first electrode having a carbonaceous surface, a second electrode and an electrolyte which includes a solvent, the step of associating a chemical compound comprises the step of associating the chemical compound with the carbonaceous surface of the first electrode. This forms a passivating layer which substantially precludes association of the solvent of the electrolyte with the carbonaceous surface. In addition, the step of associating a chemical compound further comprises the step of decomposing the electrolyte to form a passivating layer during cell cycling and storage without generating any significant amounts of gas during such decomposition.

BEST MODE OF THE INVENTION

Figure 1:
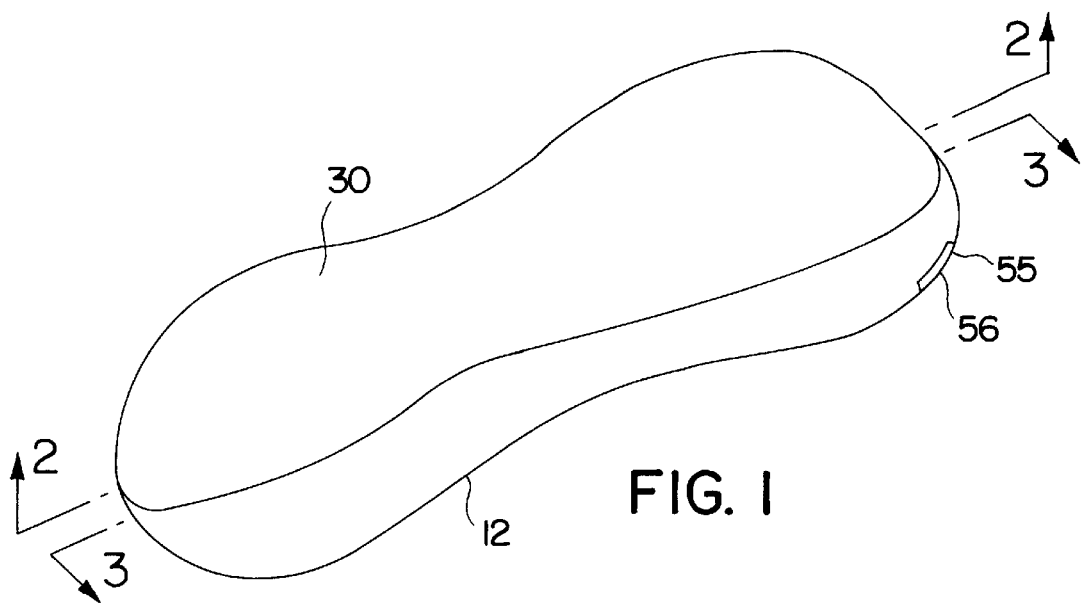
FIG. 1 of the drawings is a perspective view of a battery apparatus of the present invention.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 2:
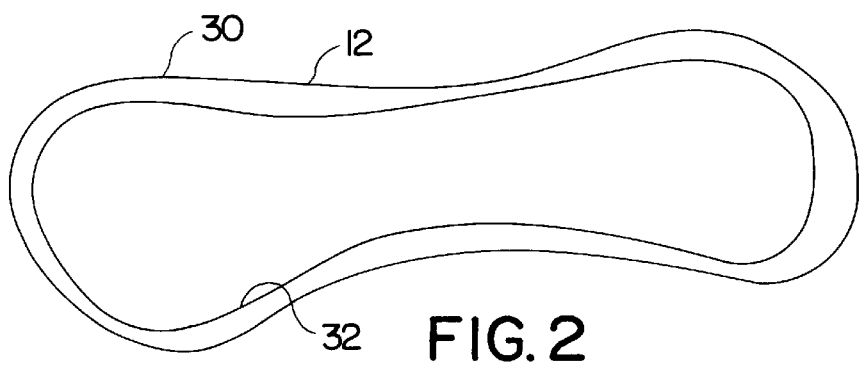
FIG. 2 of the drawings is a cross-sectional view of the battery apparatus of FIG. 1 taken generally about lines 2—2 of FIG. 1.
Figure 3:
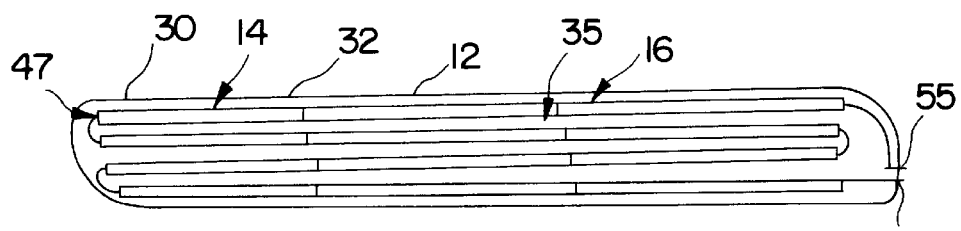
FIG. 3 of the drawings is a cross-sectional view of the battery apparatus of FIG. 1 taken generally about lines 3—3 of FIG. 1.

Battery apparatus 10 is shown in FIGS. 1–3 as comprising stacked lithium ion cells 14 (FIG. 3), casing 12 and means 16 for precluding deformation of the lithium ion cells during cell cycling and storage. As shown in FIG. 3, the lithium ion cells are arranged in a stacked configuration and include an outer periphery 47 and leads 55, 56. In addition, while various stacked configurations are contemplated as shown in particular in FIG. 3, the stacked lithium ion cells may be constructed in a monolithic structure.

Figure 4:
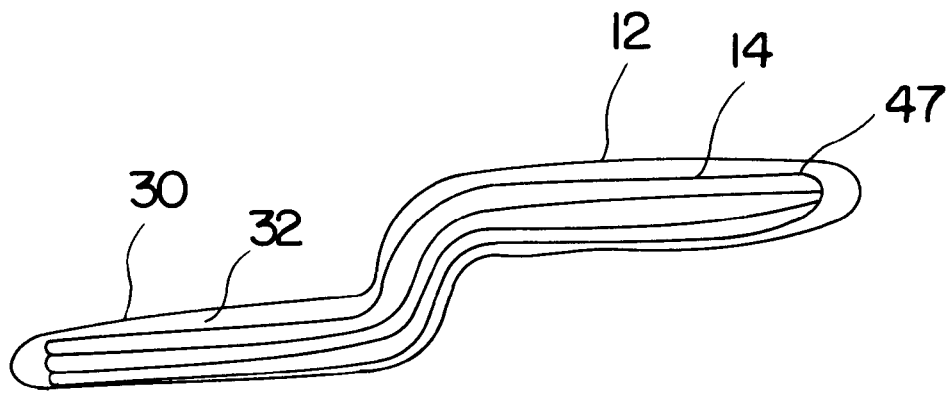
FIG. 4 of the drawings is a cross-sectional view of another freeform geometric configuration of the battery apparatus of the present invention.
Figure 5:
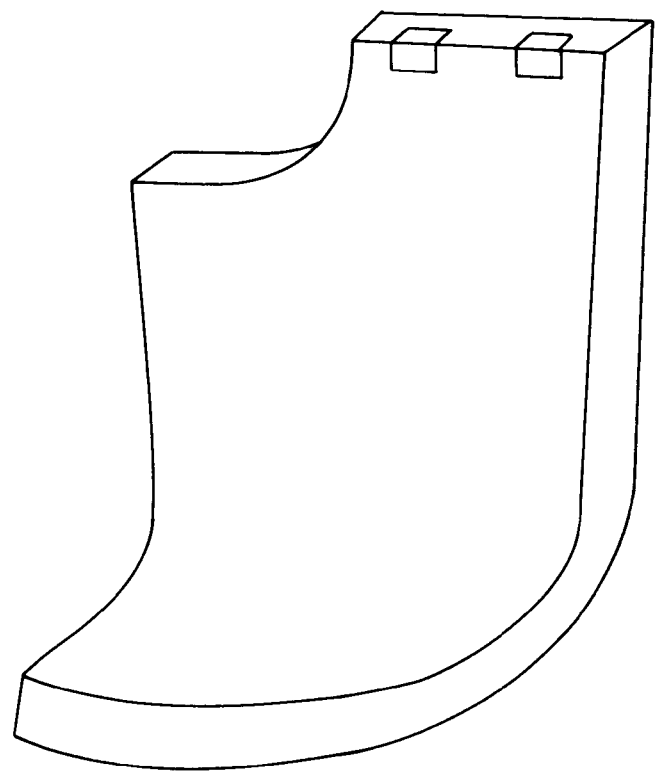
FIG. 5 of the drawings is a top plan view of freeform geometric configuration of the lithium ion cell of the present invention.

Some of the different geometric configurations and, in turn, different outer peripheries 47, of stacked lithium ion cells 14 can be seen in the embodiments shown in FIGS. 1, 4 and 5. In particular, the shapes may be any freeform geometric configuration. This would include any non-uniform geometric cross-sections, as well as conventional uniform geometric cross-sections. One such freeform geometric configuration is shown in FIG. 5, wherein the shape does not conform to any particular geometric configuration. Further, the freeform geometric configuration of the lithium ion cells may be planar, or may comprise non-planar shapes. In particular, as shown in FIG. 4, the cells may comprise an s-curve, having two bend regions. In addition, the cells may comprise arcuate configurations. In sum, and as will be explained, due to deformation preclusion means 16, the freeform geometric configuration of the cells may comprise any one of a multitude of different configurations, shapes and orientations for the cells.

Various lithium ion based cells are contemplated for use in association with the battery apparatus, including both rechargeable and non-rechargeable types having a variety of electrodes and electrolyte compositions. For example, one particular battery configuration (and associated chemistries) may be seen in co-pending U.S. application Ser. No. 08/812,021 to Dr. Denis G. Fauteux and Jie Shi entitled Electrolytic Cell Having A Controlled Electrode Surface Interface, which disclosure is incorporated by reference.

Casing 12 is shown in FIGS. 1–3 as comprising outer configuration 30 and inner periphery 32 (FIGS. 2 and 3). Inner periphery 32 may comprise any configuration which can properly accept the stacked lithium ion cells 14. Thus, the inner periphery is not limited to a particular shape, and, for example, the inner periphery may closely follow the outer periphery/contours of the lithium ion cell so that the inner periphery of the casing mates with the outer periphery of the cells. to In other configurations, outer configuration 30 of the casing may be substantially different than the shape of the inner periphery 32 and outer periphery 47 of the cells. Such may be advantageous in situations where the housing is designed to fit a particular accepting region of, for example, a cellular telephone or a computer, but where the stacked lithium ion cells comprise a configuration which is of an entirely different shape. While a multitude of materials are contemplated for use, the casing may comprise a metal, plastic or a laminated metal/plastic material and the casing material may be quite thin, e.g. between 0.3 and 0.4 mm. It is also contemplated that the thickness of the casing material may be between 0.25 and 0.35 mm. Thus, the casing is relatively lightweight.

Deformation preclusion means 16, as shown in FIG. 3, may comprise means 35 for substantially precluding the generation of gas during cell cycling and storage. One such gas generation preclusion means is disclosed in the above-identified co-pending application Ser. No. 08/812,021. Through such means for substantially precluding the generation of gas, the cells retain the desired orientation and generally maintain their integrity without the aid of outside rigidifying structures and without the application of uniform pressure against the stacked cells. Indeed, with such deformation preclusion means, the use of a casing that includes wire bindings, strong metal casings and biasing springs is not necessary to maintain the desired orientation of the cell, and to prevent the eventual deformation of the casing.

As a result, a lightweight and relatively thin casing can be utilized without any additional cumbersome and heavy rigidifying components. Moreover, not only can the overall weight of the battery apparatus be reduced, but space which was previously occupied by wire bindings, metal casings and biasing springs can be utilized to house further stacked lithium ion cells or larger individual cells. Thus, the capacity or power generation can be increased without increasing the overall size of the battery apparatus.

In addition, without the build-up of excess pressure within the cells, it is not necessary to apply otherwise required uniform pressure against the stacked lithium ion cells. Thus, the shapes of the stacked lithium ion cells are not limited to common square and rectangular box-like shapes but, as explained above, may take on any number of freeform geometric configurations, as shown in FIGS. 4 and 5.

To manufacture battery apparatus 10, the desired shape of the casing 12 for the particular application and capacity and shape of the stacked lithium ion cells 14 is determined. Subsequently, casing 12 having inner periphery 32 and outer configuration 30 is formed which will house the stacked lithium ion cells. While inner periphery 32 of the casing need not follow outer periphery 47 of the stacked lithium ion cells, it is necessary that the casing is sized so as to be able to house the stacked lithium ion cells.

Once the casing is formed, lithium ion cells 14 are fabricated. Any number of lithium ion cells, as needed, may be formed and orientated in a stacked configuration. Alternatively, a monolithic construction comprising a desired quantity of cells may likewise be fabricated.

In particular, the fabrication of the cells comprises the inclusion of deformation preclusion means 16. In one embodiment, deformation preclusion means 16 comprises the inclusion of a chemical compound within each of the lithium ion cells which will substantially preclude inadvertent deformation of the casing by the generation of gas which would otherwise typically occur upon decomposition of, for example, the electrolyte during formation of the passivating layer formed on an associated electrode during cell cycling and storage.

One such stackable lithium ion cell and the fabrication of same is fully disclosed in the above-identified co-pending application Ser. No. 08/812,021. As explained therein, such a cell includes a first electrode having a carbonaceous surface, a second electrode and an electrolyte having a solvent. The chemical compound is associated with the carbonaceous surface of the first electrode. In turn, a passivating layer is formed which substantially precludes the association of the solvent in the electrolyte with the carbonaceous surface of the first electrode. In such a cell, the decomposing of the electrolyte during the formation of the passivating layer during cell cycling and storage is substantially devoid of any gas generation. Thus, the integrity of the cells can be maintained, and, in turn, the casing for such a battery will not require any internal or external components for receiving the cells within the casing—as would be required for cells which generate a gas upon decomposition of the electrolyte.

Once the lithium ion cells are formed, they are positioned within the casing, and the proper leads 55, 56 are attached to the cells so as to provide contacts for the battery apparatus. As explained above, due to the deformation preclusion means, the casing and the lithium ion cells may be configured in any number of freeform shapes, without the addition of cumbersome retention structures such a biasing springs, wire wraps and heavy metal casings.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A battery apparatus comprising:
    a casing;
    at least one stacked lithium ion cell positioned within the casing; and
    means operatively associated with each of the at least one lithium ion cell for substantially precluding inadvertent deformation of the casing by the at least one lithium ion cell, during cell cycling and storage.

2. The battery apparatus according to claim 1 wherein the deformation preclusion means comprises each of the at least one cell including means for substantially precluding gas generation within the cell during decomposition of chemical constituents within the cell during cell cycling and storage.

3. The battery apparatus according to claim 2 wherein the at least one stacked lithium ion cell comprises at least two stacked lithium ion cells which are formed in a monolithic construction.

4. The battery apparatus according to claim 1 wherein each of the at least one stacked lithium ion cell comprises a freeform geometric configuration.

5. The battery apparatus according to claim 4 wherein the freeform geometric configuration comprises a non-uniform geometric cross-section.

6. The battery apparatus according to claim 4 wherein the freeform geometric configuration is non-planar.

7. The battery apparatus according to claim 6 wherein the non-planar freeform geometric configuration has at least two bend regions.

8. The battery apparatus according to claim 6 wherein the non-planar freeform geometric configuration is arcuate.

9. The battery apparatus according to claim 4 wherein the casing comprises a configuration which follows the contours of the freeform geometric configuration of the at least one stacked lithium ion cell.

10. The battery apparatus according to claim 1 wherein the casing comprises a freeform geometric configuration.

11. The battery apparatus according to claim 1 wherein the casing comprises a polymer, a metal or a metal/plastic laminate.

12. A process for fabricating a battery apparatus comprising the steps of:
    forming a casing for housing at least one stackable lithium ion cell;
    fabricating at least one lithium ion cell including the step of
        associating a chemical compound within the cell which will substantially preclude inadvertent deformation of the casing, after positioning of the cells therein, by the cell during cell cycling and storage; and
    positioning the at least one stackable lithium ion cell within the casing.

13. The process according to claim 12 wherein the at least one stackable lithium ion cell comprises two stackable lithium ion cells, the step of fabricating further comprises the step of forming the at least two stackable lithium ion cells into a monolithic configuration.

14. The process according to claim 12 wherein the step of forming the casing comprises forming the casing to include an inner periphery, which conforms to the outer periphery of the at least one stackable lithium ion cell.

15. The process according to claim 12 wherein each cell includes a first electrode having a carbonaceous surface, a second electrode and an electrolyte having a solvent, the step of associating a chemical compound comprises the steps of:
    associating the chemical compound with the carbonaceous surface of the first electrode, to, in turn, form a passivating layer which substantially precludes association of the solvent of the electrolyte with the carbonaceous surface; and
    decomposing the electrolyte to form a passivating layer during cell cycling and storage without generating any significant amounts of gas during such decomposition.

* * * * *